United States Patent [19]

Kooijmans et al.

[11] Patent Number: 4,738,995

[45] Date of Patent: Apr. 19, 1988

[54] PREPARATION OF EPOXY BINDERS FOR COATINGS

[75] Inventors: Petrus G. Kooijmans; Stephen A. Stachowiak; Werner T. Raudenbusch; Jurrianus Bekooy, all of Amsterdam, Netherlands

[73] Assignee: Shell Oil Company, Houston, Tex.

[21] Appl. No.: 662,120

[22] Filed: Oct. 18, 1984

[30] Foreign Application Priority Data

Nov. 9, 1983 [GB] United Kingdom ................ 8329881

[51] Int. Cl.$^4$ ......................... C08K 5/16; C08L 63/00
[52] U.S. Cl. ................................... 523/404; 204/14.1
[58] Field of Search ......................................... 523/404

[56] References Cited

U.S. PATENT DOCUMENTS

| | | | |
|---|---|---|---|
| 3,547,881 | 12/1970 | Mueller | 528/87 |
| 4,150,006 | 4/1979 | Raudenbusch et al. | 528/87 |
| 4,331,574 | 5/1982 | Bekooij et al. | 525/530 |
| 4,332,711 | 6/1982 | Kooymans et al. | 523/402 |
| 4,415,682 | 11/1983 | Becker | 524/404 |

Primary Examiner—Christopher Henderson

[57] ABSTRACT

This invention relates to a process for the preparation of water-thinnable, curable binders for coatings prepared by reacting a multifunctional polyglycidyl ether (epoxy novolac resin), a diglycidyl ether of a polyhydric phenol and an amino compound.

11 Claims, No Drawings

PREPARATION OF EPOXY BINDERS FOR COATINGS

FIELD OF THE INVENTION

This invention relates to a process for the preparation of water-thinnable curable binders for coatings, to binders prepared by the process, to aqueous thermosetting coating compositions containing the binders and to the use of such compositions in coating articles.

BACKGROUND OF THE INVENTION

U.S. patent application Ser. No. 609,610, filed May 14, 1984, now U.S. Pat. No. 4,593,078 provides a polyglycidyl ether having on average n epoxy groups per molecule, where $1 < n \leq 2$, which comprises the reaction product of a multifunctional polyglycidyl ether having on average x epoxy groups per molecule, where $x > 2$, with $(x-n)$ mole of monofunctional phenol per mol of the multifunctional polyglycidyl ether. One use of such polyglycidyl ethers is in a process for preparing a resinous compound for use in a thermosetting coating composition, which process comprises reacting such a polyglycidyl ether in aqueous medium with an amino compound containing on average two amino-hydrogen atoms per molecule at a temperature in the range 100° to 120° C. Thermosetting coating compositions are prepared by combining such resulting resinous compounds with a cross-linking compound in a weight ratio of from 95:5 to 65:35 before or after neutralization.

If desired, a quantity of a known liquid or solid diglycidyl ether, such as a liquid or solid bisphenol-A-derived diglycidyl ether, e.g. those marketed under the trade designation of EPON® Resin 828, EPON® Resin 1007, etc., may be included with the above polyglycidyl ether in the reaction in aqueous medium in the above process for preparing a resinous compound.

EPON® Resin 828 is a liquid diglycidyl ether of 2,2-bis(4-hydroxyphenyl)propane having an epoxy equivalent weight of 182 g to 194 g. EPON® Resin 1007 is a solid diglycidyl ether of 2,2-bis(4-hydroxyphenyl)propane having an epoxy equivalent weight of 1500 g to 2000 g. "Epoxy equivalent weight" ("WPE") is the weight in grams of glycidyl compound containing 1 g-equivalent of epoxide.

It has now been found that use of a diglycidyl ether having WPE in the range 300 g to 1500 g in a specific range of weight ratios of polyglycidyl ether:diglycidyl ether enables cured coatings having surprisingly enhanced flexibility to be obtained from stable thermosetting coating compositions.

SUMMARY OF THE INVENTION

The present invention provides a process for the preparation of a water-thinnable, curable binder for coatings which comprises reacting together in aqueous medium at a temperature in the range 100° to 120° C., a polyglycidyl ether which is the reaction product of a multifunctional polyglycidyl ether and a monofunctional phenol, having 1 to 2 residual epoxy groups per molecule, a diglycidyl ether having a WPE in the range 300 g to 1500 g and an amino compound containing, on average, two amino-hydrogen atoms per molecule, the weight ratio of the polyglycidyl ether to the diglycidyl ether being in the range 75:25 to 45:55 and the amino compound being included in an amount sufficient to provide 1 to 1.5 amino-hydrogen atoms per epoxy group from the polyglycidyl and diglycidyl ethers; binders prepared by the process; thermosetting coating compositions containing them; and to the use of such compositions in electrodeposition coating of articles.

DESCRIPTION OF THE PREFERRED EMBODIMENTS

The present invention, therefore, is particularly directed to a process for the preparation of a water-thinnable curable binder for coatings which comprises reacting together in aqueous medium at a temperature in the range 100° to 120° C., a polyglycidyl ether having on average n epoxy groups per molecule, where $1 < n \leq 2$, which comprises the reaction product of a multifunctional polyglycidyl ether having on average x epoxy groups per molecule, where $x > 2$, with $(x-n)$ mol of a monofunctional phenol per mol of the multi-functional polyglycidyl ether, a diglycidyl ether having a WPE in the range 300 g to 1500 g and an amino compound containing on average two amino-hydrogen atoms per molecule, the weight ratio of the polyglycidyl ether to the diglycidyl ether being in the range 75:25 to 45:55 and the amino compound being included in an amount sufficient to provide 1 to 1.5 amino-hydrogen atoms per epoxy group from the polyglycidyl and diglycidyl ethers.

The multifunctional polyglycidyl ether may conveniently be a polyglycidyl ether prepared by reaction of a polyhydric phenol having a phenolic hydroxyl functionality greater than 2, with an epihalohydrin, preferably epichlorohydrin, in the presence of a hydrogen halide acceptor, e.g., an alkali metal hydroxide.

Examples of suitable such polyhydric phenols are novolac resins of general formula:

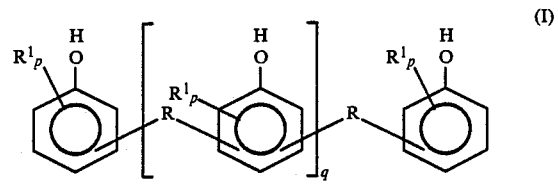

wherein R represents an alkylene, e.g., $CH_2$ group, $R^1$ represents an alkyl group, e.g., a methyl, p-t-butyl, octyl or nonyl group, q and p are numbers having average values $0 < q \leq 6$ and $0 \leq p \leq 2$, or of general formula:

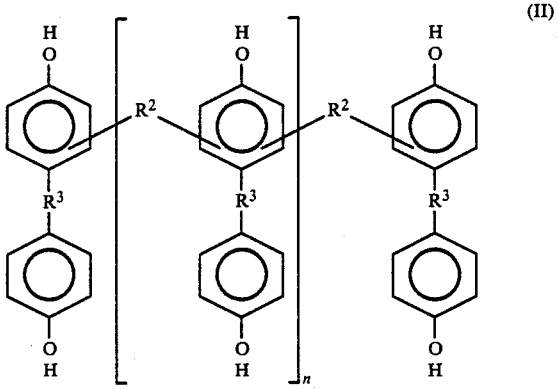

wherein $R^2$ represents an alkylene, e.g., $CH_2$, group, $R^3$ represents an alkylene, e.g., $CH_2$ or $C(CH_3)_2$ group, a carbonyl group, an oxygen or sulfur atom and n is a number having an average value in the range 0 to 2.

Other examples of suitable polyhydric polynuclear phenols are 1,1-2,2-tetra(4-hydroxyphenyl)ethane and the tetraphenol derived from diphenolic acid having the general formula:

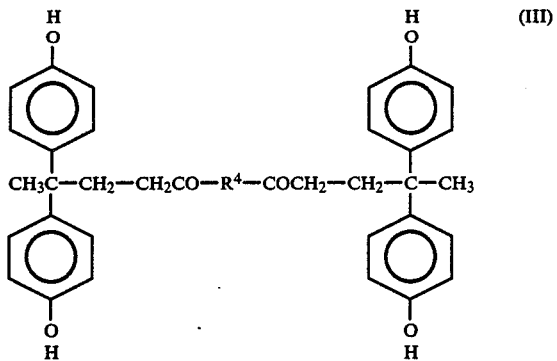

wherein $R^4$ represents the residue of a diol. Polyglycidyl ethers derived from polyhydric phenols of formulae I, II and III are known and are described, together with processes for their preparation, in, for example, U.S. Pat. No. 2,844,553.

Preferably, the multifunctional polyglycidyl ether is an epoxy novolac resin wherein x is greater than 2 and is in the range from 2 to 6, and more preferably x is in the range from 3 to 4.

Advantageously, the epoxy novolac resin is derived from a novolac of formula I wherein R is $CH_2$, q is 1 to 2 and p is 0 to 1 or a bisphenol novolac of formula II wherein $R^2$ is $CH_2$, $R^3$ is $C(CH_3)_2$ and n is 0.

Preferably n is in the range 1.3 to 2 and advantageously n may be in the range 1.4 to 1.7.

The monofunctional phenol may be a single phenol or a mixture of phenols. For example the phenol may conveniently be phenol optionally substituted by one or more of one or more substituents selected from $C_{1-6}$ alkyl, $C_{3-16}$ alkenyl, $C_{1-4}$ hydroxyalkyl, $C_{2-13}$ alkoxycarbonyl and $C_{1-6}$ alkoxy groups. Examples of such compounds include phenol, the cresols, salicyl alcohol, 2-allyl phenol, 2,4,6-triallyl phenol, dimethyl phenol, 4-hydroxymethyl-2,6-dimethyl phenol, 2-hydroxyphenethyl alcohol, 4-hydroxybenzyl alcohol and ethyl 4-hydroxybenzoate. Preferably the monofunctional phenol is phenol substituted in the para-position by a $C_{4-12}$ alkyl substituent. Examples of such alkyl substituents include n-, iso- and t-butyl, n- and iso-octyl, n- and iso-nonyl and n- and iso-dodecyl groups. Branched alkyl substituents are particularly suitable. P-iso-octyl phenol has been found to be a very suitable monofunctional phenol.

The polyglycidyl ethers may conveniently be prepared by reacting the multifunctional polyglycidyl ether with the monofunctional phenol at a temperature in the range 120° to 180° C. in the presence of an acid or base catalyst.

Preferably reaction is at a temperature in the range 130° to 150° C.

The acid or base catalyst may be, for example, a tertiary amine, a quaternary ammonium or phosphonium salt or an alkali metal hydroxide or carbonate, or sulphuric acid.

The tertiary amine may be, for example, triethanolamine, benzyl dimethylamine or 2-dimethylamino-2-methyl-1-propanol. Quaternary ammonium salts, e.g., tertiary ammonium chloride, as preferred catalysts.

Tertiary amine catalysts are preferably used in amounts from 0.1 to 1 %w of reactants and quaternary ammonium salts are preferably employed in amounts from 0.005 to 0.2 %w of reactants.

The diglycidyl ether is preferably a diglycidyl ether of a dihydric phenol, e.g., a bisphenol. Conveniently the diglycidyl ether is a diglycidyl ether of 2,2-bis(4-hydroxyphenyl)propane having an epoxy molar mass in the range 300 g to 1500 g. Preferably the diglycidyl ether has an epoxy molar mass in the range 400 g to 1100 g. Examples of very suitable diglycidyl ethers of 2,2-bis(4-hydroxyphenyl)propane include EPON® Resin 1001 (WPE of 450 g to 500 g) and EPON® Resin 3003 (WPE of 725 g to 825 g).

The weight ratio of the polyglycidyl ether to the diglycidyl ether is preferably in the range 65:35 to 55:45. Very good results have been obtained when the ratio is substantially 60:40.

The amino compound is preferably included in an amount sufficient to provide 1 to 1.2, more preferably 1 to 1.1, amino-hydrogen atoms per epoxy group.

The most preferred amino compound is 2-amino-2-methyl-1-propanol.

The invention further provides binders prepared by the process of the invention and also aqueous thermosetting coating compositions comprising (A) a binder prepared by the process of the invention and (B) a cross-linking compound in a solids weight ratio A:B in the range from 95:5 to 65:35, preferably 90:10 to 70:30, more preferably 85:15 to 75:25. The thermosetting coating compositions are prepared by combining the binder with the cross-linking compound before or after neutralization. The invention also specifically provides use of a thermosetting coating composition of the invention in electrodeposition of articles (cathodic electrodeposition).

Preferred cross-linking compounds, for addition to the binder compounds before or after neutralization, are water-soluble cross-linking agents of the aminoplast type, such as alkoxylated reaction products of formaldehyde with melamine or benzoguanamine.

Other cross-linking compounds include urea-formaldehyde resins, phenol-formaldehyde resins, and blocked polyisocyanates.

Pigments, fillers, dispersing agents, and other components known in the art of paint formulation may further be added. Addition of small amounts (up to 1 %w) of non-ionic surfactant may be useful for further stabilization of aqueous compositions or improvement of the wetting during application. Co-solvents, such as 2-n-butoxyethanol and, especially, 2-n-hexyloxyethanol, may advantageously be included. The water for use in the aqueous compositions is preferably purified, such as by distillation or demineralization. The water-dilutable compositions may be applied by a variety of methods known in the art, onto a variety of substrates, in particular metals such as bare steel, phosphated steel, chromate-treated steel, zinc, tin plate (for can coating), and aluminum (also e.g. for can coating), to produce cured coatings of desirable thickness, from 2 micrometers upwards up to in general 40 micrometers.

Curing can be performed by stoving, for example, at temperatures from 150° to 220° C., with curing times varying from 2 to 30 minutes.

The thermosetting coating compositions may generally be applied by electrodeposition and other methods such as spraying or dipping, and are particularly suitable for coating cans by electrodeposition. Those skilled in the art will appreciate the need to select compounds which are approvable by regulatory authorities when food or beverage cans are to be coated.

The invention will be further understood from the following examples, in which parts and percentages are by weight, unless otherwise indicated, and various terms are defined as follows:

"Multifunctional polyether A" is a semi-solid multifunctional epoxy novolac resin of average molecular weight 680 g, containing on average 3.5 epoxy groups per molecule.

"Difunctional resin D" is a solid diglycidyl ether of 2,2-bis(4-hydroxyphenyl)propane having a WPE of about 485, and containing on average 1.85 epoxy groups per molecule.

"AV" is acid value, expressed in mg KOH/g,

"Amine value" is expressed in milli-equivalents per gram, and

"CYMEL 1141" (trademark) is a highly alkylated melamineformaldehyde curing resin containing methoxy and isobutoxy substituents and acidic chelating groups, 85% solids in isobutanol, AV 22±3 mg KOH/g.

EXAMPLE 1

Adduct for Use as Cathodic Electrodeposition Binder (a) Preparation of reaction product of multifunctional polyglycidyl ether with monofunctional phenol Multifunctional polyether A (680 g, 1 mol, 3.5 epoxy equivalents) and p-iso-octylphenol (412 g, 2 mol) were heated with stirring to 140° C. When the mixture was homogeneous, a 50 %w aqueous solution of tetramethylammonium chloride (0.55 g) was added and the mixture was maintained at 140° C. until reaction was complete (4 hours). The product was thinned with 2-n-butoxyethanol (546 g) and cooled to ambient temperature (20°). The resulting solution contained 66.7 %w solids, the desired polyether product having average molecular weight 1092 and an epoxy content of 1.37 meq./g solids (average of 1.5 epoxy groups per molecule).

(b) Preparation of adduct for use as cathodic electrodeposition binder

A 95 %w aqueous solution of 2-amino-2-methyl-1-propanol (154.6 g, 1.65 mol), water (40 g) and 2-n-butoxyethanol (100 g) were heated with stirring to 100° C. To the resulting mixture was added a homogeneous mixture of reaction product from step (1) (1638 g; 66.7% solids; 1.5 epoxy equivalents), difunctional resin D (727.5 g, 1.5 epoxy equivalents) and 2-n-butoxyethanol (197 g), over 2 hours, with stirring, while the temperature was maintained at 100° to 110° C. After addition was complete, the mixture was kept at 100° to 120° C. with stirring for a further 8 hours, until reaction was complete (amine value 0.84 on solids). The resulting product had a solids content of 68.8 %w.

EXAMPLE 2

Addition Use as Cathodic Electrodeposition Binder

The procedure of Example 1(b) was followed, with the exception that only 147.6 g (1.575 mol) of the 95 %w aqueous solution of 2-amino-2-methyl-1-propanol was used. The resulting product had a solids content of 68.8 %w and amine value 0.80 on solids.

EXAMPLE 3

The procedure of Example 1(b) was followed, with the exception that 168.6 g (1.8 mol) of the 95 %w aqueous solution of 2-amine-2-methyl-1-propanol was used. The resulting product had a solids content of 68.9 %w and amine value 0.91 on solids.

EXAMPLE 4

Cathodic Electrodeposition Composition

The adduct of Example 1 (321.6 g), "CYMEL 1141" (60 g) and 2-n-hexyloxyethanol (61.2 g) were mixed together at ambient temperature (20° C.). The resulting homogeneous mixture was neutralized with 90 %w lactic acid in water (12.5 g, $\alpha=0.7$) and thinned with demineralized water (2267.4 g). The resulting coating composition had a solids content of 10 %w, pH 4.2 and conductivity 650 $\mu$s/cm at 20° C.

EXAMPLE 5

Cathodic Electrodeposition Composition

The adduct of Example 2 (804 g), "CYMEL 1141" (150 g) and 2-n-hexyloxyethanol (153 g) were mixed together at ambient temperature (20° C.). The resulting homogeneous mixture was neutralized with 90 %w lactic acid in water (34 g, $\alpha=0.77$) and thinned with demineralized water (3400.8 g). The resulting coating composition had a solids content of 15 %w, pH 4.0 and conductivity 650 $\mu$s/cm at 20° C.

EXAMPLE 6

Cathodic Electrodeposition Composition

The adduct of Example 3 (321.6 g), "CYMEL 1141" (60 g) and 2-n-hexyloxyethanol (61.2 g) were mixed together at ambient temperature (20° C.). The resulting homogeneous mixture was neutralized with 90 %w lactic acid in water (12.5 g, $\alpha=0.62$) and thinned with demineralized water (1360 g). The resulting coating composition had a solids content of 15 %w, pH 4.9 and conductivity 984 $\mu$s/cm at 20° C.

EXAMPLE 7 TO 9

Use of Cathodic Electrodeposition Compositions in Can Coating

The coating compositions of Examples 4 to 6 were used to coat 330 ml tin-plate cans by cathodic electrodeposition. The can formed the cathode of an electrodeposition cell, the anode being a stainless steel member inserted within the can at a substantially uniform separation of 2 millimeters from the can. A potential difference was applied between the can and the anode, for a total time of 400 milliseconds. After electrodeposition the coated can was vigorously rinsed with demineralized water, and the coating was cured by stoving the coated can for 5 or 10 minutes at 200° C.

After curing and measuring coating weight, porosity was tested by using an electrolyte solution containing a red indicator (6.2 V for 30 sec.) subsequently the cans were filled with a second clear electrolyte solution. The areas of the can not covered by the coating, became now red colored. Using this method it is easy to identify pores or other coating defects.

For comparative purposes similar experiments were effected with the coating composition of Example 13 of co-pending U.S. patent application Ser. No. 609,610, filed May 14, 1984, (pH 3.8, conductivity 501 μs/cm) (Comparative Example A), and with similar coating compositions based on the adducts of Examples 5 and 15 of co-pending U.S. patent application Ser. No. 609,610 but wherein the adduct: "CYMEL 1141" solids weight ratio was 80:20 instead of 70:30 (Comparative Examples B and C respectively). Results are given in Table I following, in which solvent resistance is expressed in terms of "MEK rubs", i.e. the number of double rubs with a methylethylketone-moistened cloth necessary to remove the coatings, and flexibility was determined by the wedge bend test, in which coated tin-plate is bent over a 3 mm mandrel and impacted into a wedge shape, immersed in a $CuSO_4/HCl$ solution for 2 minutes, and staining, which is observed wherever breaks in this film occur, is recorded.

TABLE I

| Example | Composition | Adduct "CYMEL 1141" solids wt. ratio | Application voltage (V) | Stoving time (min) | Film thickness (microns) | Coating weight (mg) | Porosity (mA) | MEK rubs | Flexibility wedge bend (% failure) |
|---|---|---|---|---|---|---|---|---|---|
| 7 | 4 | 81.3:18.7 | 115 | 5 | 5 | 216 | 0.6 | 70–80 | 20 |
|   |   |   |   | 10 | 5 | 208 | 0.6 | >100 | 26 |
| 8 | 5 | 81.3:18.7 | 110 | 5 | 5 | 198 | 0.4 | 60–80 | 28 |
|   |   |   |   | 10 | 5 | 194 | 0.7 | >100 | 25 |
| 9 | 6 | 81.3:18.7 | 110 | 5 | 5.5 | 250 | 0.2 | 80–90 | 20 |
|   |   |   |   | 10 | 5.5 | 245 | 1.5 | >100 | — |
| Comparative A |   | 70:30 | 110 | 5 | 5 | 225 | 0.5 | >100 | 70 |
|   |   |   |   | 10 | 5 | 209 | 0.4 | >100 | 70 |
| Comparative B |   | 80:20 | 110 | 5 | 5 | 192 | 0.2 | 14–20 | 100 |
|   |   |   |   | 10 | 5 | 220 | 0.5 | 16–20 | 100 |
| Comparative C |   | 80:20 | 110 | 10 | 5 | 200 | — | <20 | 100 |

The coatings of examples 7 to 9 all exhibited excellent properties, and significantly superior flexibility to that of Comparative Example A.

What is claimed is:

1. A process for preparing a water-thinnable curable binder for coatings which comprises reacting together in an aqueous reaction medium at a temperature in the range of 100° to 120° C. constituents comprising:
   (a) a polyglycidyl ether having an average of n epoxy groups per molecule, where 1 is <n is ≦ to 2, which polyglycidyl ether is the reaction product of a multifunctional polyglycidyl ether having an average of x epoxy groups per molecule, where x>2, with (x−n) moles of a monofunctional phenol per mole of the multifunctional polyglycidyl ether;
   (b) a diglycidyl ether of a dihydric phenol, said diglycidyl ether having a weight per epoxide in the range of 300 g to 1500 g; and
   (c) an amino compound containing an average of 2 amino hydrogen atoms per molecule;
wherein constituents (a) and (b) are present in the aqueous reaction medium in a weight ratio in the range of 75:25 to 45:55 and the amino compound is present in an amount sufficient to provide from 1 to 1.5 amino hydrogen atoms per epoxy group of the polyglycidyl ether and the diglycidyl ether.

2. The process of claim 1 wherein the polyglycidyl ether which is derived from a multifunctional polyglycidyl ether is an epoxy novolac resin wherein $3 \leq x \leq 4$.

3. The process of claim 1 wherein, in the polyglycidyl ether, $1.3 \leq n \leq 2$.

4. The process of claim 1 wherein the monofunctional phenol from which the polyglycidyl ether is derived is phenol substituted in the para-position by a $C_{4-12}$ alkyl substituent.

5. The process of claim 1 wherein the diglycidyl ether is a diglycidyl ether of 2,2-bis(4-hydroxyphenyl)propane having a weight per epoxide in the range of from 300 g to 1500 g.

6. The process of claim 1 wherein the diglycidyl ether has a weight per epoxide in the range of from 400 g to 1100 g.

7. The process of claim 1 wherein the weight ratio of the polyglycidyl ether to the diglycidyl ether is in the range from about 65:35 to 55:45.

8. The process of claim 1 wherein the amino compound is 2-amino-2-methyl-1-propanol.

9. The process of claim 1 wherein the amino compound is included in an amount sufficient to provide 1 to 1.2 amino-hydrogen atoms per epoxy group.

10. The process of claim 1 wherein the amino compound is included in an amount sufficient to provide 1 to 1.1 amino-hydrogen atoms per epoxy group.

11. A binder composition prepared by the process of claim 1.

* * * * *